US011514272B2

United States Patent
Zhang et al.

(10) Patent No.: US 11,514,272 B2
(45) Date of Patent: Nov. 29, 2022

(54) APPARATUS AND METHOD FOR TRAINING CLASSIFICATION MODEL AND APPARATUS FOR PERFORMING CLASSIFICATION BY USING CLASSIFICATION MODEL

(71) Applicant: FUJITSU LIMITED, Kawasaki (JP)

(72) Inventors: Meng Zhang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 564 days.

(21) Appl. No.: 16/736,180

(22) Filed: Jan. 7, 2020

(65) Prior Publication Data
US 2020/0265272 A1 Aug. 20, 2020

(30) Foreign Application Priority Data
Feb. 19, 2019 (CN) .......................... 201910124176.0

(51) Int. Cl.
*G06K 9/62* (2022.01)
*G06N 20/00* (2019.01)
*G06N 3/08* (2006.01)

(52) U.S. Cl.
CPC ........... *G06K 9/6268* (2013.01); *G06K 9/629* (2013.01); *G06K 9/6232* (2013.01); *G06N 3/08* (2013.01); *G06N 20/00* (2019.01)

(58) Field of Classification Search
CPC .... G06K 9/6268; G06K 9/6232; G06K 9/629; G06K 9/6256; G06N 3/08; G06N 3/0454;
(Continued)

(56) References Cited

U.S. PATENT DOCUMENTS

| 10,303,981 B1* | 5/2019 | Kim .................... G06V 10/776 |
| 2018/0114055 A1* | 4/2018 | Wang ................... G06V 40/168 |

FOREIGN PATENT DOCUMENTS

| JP | 106570518 A | 4/2017 |
| WO | 2016/141282 A1 | 9/2016 |

OTHER PUBLICATIONS

Haibing Wu et al., "Towards dropout training for convolutional neural networks", Neural Networks, vol. 71, Nov. 1, 2015, pp. 1-10, cited in Extended European Search Report dated Jul. 20, 2020. (10 pages).

(Continued)

*Primary Examiner* — John B Strege
(74) *Attorney, Agent, or Firm* — WHDA, LLP

(57) ABSTRACT

An apparatus for training a classification model includes: a feature extraction unit configured to set, with respect to each training set of a first predetermined number of training sets, feature extraction layers, and extract features of a sample image, where at least two of the training sets at least partially overlap; a feature fusion unit configured to set, with respect to training set, feature fusion layers, and perform a fusion on the extracted features of the sample image; and a loss determination unit configured to set, with respect to training set, a loss determination layer, calculate a loss function of the sample image based on the fused feature of the sample image, and train a classification model based on the loss function. The first predetermined number of training sets share at least one layer of feature fusion layers and feature extraction layers set with respect to each training set.

16 Claims, 7 Drawing Sheets

(58) Field of Classification Search
CPC ...... G06N 20/00; G06V 10/454; G06V 10/82; G06V 40/172; G06V 40/168
See application file for complete search history.

(56) References Cited

OTHER PUBLICATIONS

Xu Chunyan et al., "Multi-loss regularized deep neural network", IEEE Transactions on Circuits and System for Video Technology, vol. 26, No. 12, Dec. 1, 2016, pp. 2273-2283, cited in Extended European Search Report dated Jul. 20, 2020. (11 pages).
Extended European Search Report dated Jul. 20, 2020, issued in counterpart application No. 20151409.8. (8 pages).
Khurshid et al., "Word Spotting in Historical Printed Documents Using Shape and Sequence Comparisons", Jul. 2012, (23 pages).

* cited by examiner

600 — Extract features of an image to be classified by using the feature extraction layers set with respect to each training set of the first predetermined number of training sets in the classification model, to obtain the extracted features of the image to be classified — S602

Perform a fusion on the extracted features of the image to be classified by using the feature fusion layers set with respect to each training set of the first predetermined number of training sets in the classification model, to obtain the fused features of the image to be classified — S604

Calculate the loss function of the image to be classified based on the fused features of the image to be classified by using the loss determination layer set with respect to the first predetermined number of training sets in the classification model, and classify the image to be classified based on the loss function — S606

Figure 6

APPARATUS AND METHOD FOR TRAINING CLASSIFICATION MODEL AND APPARATUS FOR PERFORMING CLASSIFICATION BY USING CLASSIFICATION MODEL

CROSS-REFERENCE TO RELATED APPLICATIONS

This application claims the priority benefit of Chinese Patent Application No. 201910124176.0, filed on Feb. 19, 2019 in the China National Intellectual Property Administration, the disclosure of which is incorporated herein in its entirety by reference.

FIELD

The present disclosure relates to the field of information processing, and in particular to an apparatus and method for training a classification model, and an apparatus and method for performing classification by using a classification model.

BACKGROUND

In recent years, with the collection of large-scale facial data, vehicle data and so on as well as the application of the convolutional neural network, the classification technology such as face recognition and license plate recognition achieves great progress in both the academic aspect and the industry aspect, and is widely applied. Presently, the main concept to improve the classification performance of the face recognition and vehicle plate recognition is to add data. However, collection of the large-scale data consumes a lot of time and energy. For the facial data, the currently published facial data sets include VGG2Face, Ms-Celeb-1M, Mega-Face and so on. Each data set has its advantage and disadvantage. The classification performance can be effectively improved by sufficiently utilizing the advantages of each data set. A simplest method is to directly place multiple data sets together. However, cross data exists among different data sets, and the same data may have different labels in different data sets. If the multiple data sets are fused together, the trained classification model may not converge or has poor performances. In addition, in a case that the application scenario has great gesture change, a low resolution and poor quality and so on, the classification performance will be degraded significantly.

SUMMARY

The brief summary of the present disclosure is given in the following, so as to provide basic understanding on certain aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

In view of above, an object of the present disclosure is to provide an apparatus and method for training a classification model and an apparatus and method for performing classification by using a classification model, so as to overcome one or more disadvantages in the conventional technology.

According to an aspect of the present disclosure, an apparatus for training a classification model is provided. The apparatus includes: a feature extraction unit configured to set, with respect to each training set of a first predetermined number of training sets, a corresponding number of feature extraction layers respectively, and configured to extract, with respect to each sample image, features of the sample image by using feature extraction layers set with respect to a training set to which the sample image belongs, to obtain extracted features of the sample image, where at least two of the first predetermined number of training sets at least partially overlap; a feature fusion unit configured to set, with respect to each training set of the first predetermined number of training sets, a corresponding number of feature fusion layers respectively, and configured to perform, with respect to each sample image, a fusion on the extracted features of the sample image by using feature fusion layers set with respect to a training set to which the sample image belongs, to obtain fused features of the sample image; and a loss determination unit configured to set, with respect to each training set of the first predetermined number of training sets, a loss determination layer, and configured to calculate, with respect to each sample image, a loss function of the sample image based on the fused features of the sample image by using a loss determination layer set with respect to a training set to which the sample image belongs, and to train the classification model based on the loss function. The first predetermined number of training sets share at least one layer of the feature fusion layers and the feature extraction layers set with respect to each training set respectively.

According to another aspect of the present disclosure, a method for training a classification model is provided. The method includes: a feature extraction step of, setting, with respect to each training set of a first predetermined number of training sets, a corresponding number of feature extraction layers respectively, and extracting, with respect to each sample image, features of the sample image respectively by using feature extraction layers set with respect to a training set to which the sample image belongs, to obtain extracted features of the sample image, where at least two of the first predetermined number of training sets at least partially overlap; a feature fusion step of, setting, with respect to each training set of the first predetermined number of training sets, a corresponding number of feature fusion layers respectively, and performing, with respect to each sample image, a fusion on the extracted features of the sample image by using feature fusion layers set with respect to a training set to which the sample image belongs, to obtain fused features of the sample image; and a loss determination step of, setting, with respect to each training set of the first predetermined number of training sets, a loss determination layer respectively, calculating, with respect to each sample image, a loss function of the sample image based on the fused features of the sample image by using a loss determination layer set with respect to a training set to which the sample image belongs, and training the classification model based on the loss function, where the first predetermined number of training sets share at least one layer of the feature extraction layers and the feature fusion layers which are set with respect to each training set respectively.

According to another aspect of the present disclosure, an apparatus for performing classification by using a classification model is provided. The apparatus includes: a second feature extraction unit configured to extract, by using a corresponding number of feature extraction layers in the classification model which are set with respect to each training set of a first predetermined number of training sets respectively, features of an image to be classified respectively, to obtain extracted features of the image to be classified; a second feature fusion unit configured to perform, by using a corresponding number of feature fusion layers in the classification model which are set with respect to each training set of the first predetermined number of training sets respectively, a fusion on the extracted features of the image to be classified, to obtain fused features of the image to be classified; and a second loss determination unit configured to calculate, by using loss determination layers in the classification model which are set with respect to the first predetermined number of training sets respectively, a loss function of the image to be classified based on the fused features of the image to be classified, and to classify the image to be classified based on the loss function. In the classification model, the first predetermined number of training sets share at least one layer of the feature fusion layers and the feature extraction layers which are set with respect to each training set respectively.

According to other aspects of the present disclosure, a computer program code and a computer program product for implementing the method according to the present disclosure are further provided.

Other aspects of the embodiments of the present disclosure are described in the specification in the following. Preferred embodiments of the present disclosure are described in detail to fully disclose the solutions of the present disclosure, but the preferred embodiments are not intended to limit the present disclosure.

BRIEF DESCRIPTION OF THE DRAWINGS

The present disclosure may be understood better with reference to the detailed description given in conjunction with the drawings in the following. In the drawings, the same or similar components are represented by the same or similar reference numerals. All the drawings together with the detailed illustration below are included in the specification and form a part of the specification, so as to illustrate the preferred embodiments of the present disclosure and explain the principles and advantages of the present disclosure by examples. In the drawings:

FIG. 6 is a flowchart of a flow example of a method for performing classification by using a pre-trained classification model according to an embodiment of the present disclosure.

DETAILED DESCRIPTION

Figure 1:
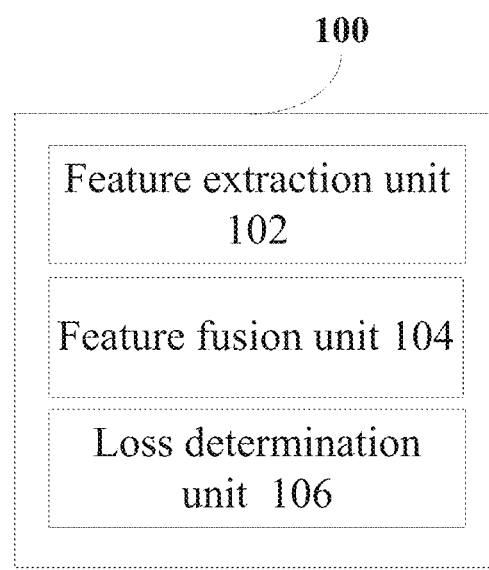
FIG. 1 is a block diagram of an example of functional configurations of an apparatus for training a classification model according to an embodiment of the present disclosure.

An exemplary embodiment of the present disclosure will be described hereinafter in conjunction with the drawings. For conciseness and clarity, not all features of an actual embodiment are described in this specification. However, it should be appreciated that numerous implementation-specific decisions shall be made during developing any of such actual implementations so as to achieve specific targets of the developer, for example, to comply with constraining conditions related to system and business, which may change for different implementations. Furthermore, it should also be understood that although the development work may be complicated and time-consuming, for those skilled in the art benefiting from the present disclosure, such development work is only a routine task.

Here, it should further be noted that in order to avoid obscuring the present disclosure due to unnecessary details, only a device structure and/or processing steps closely related to the solution of the present disclosure are illustrated in the drawing, and other details less related to the present disclosure are omitted.

Hereinafter embodiments of the present disclosure are described in detail in conjunction with the drawings.

First, a functional block diagram of an apparatus 100 for training a classification model according to an embodiment of the present disclosure is described with reference to FIG. 1. FIG. 1 is a block diagram of an example of functional configurations of the apparatus 100 for training a classification model according to an embodiment of the present disclosure. As shown in FIG. 1, the apparatus 100 for training a classification model according to the embodiment of the present disclosure includes a feature extraction unit 102, a feature fusion unit 104 and a loss determination unit 106.

The feature extraction unit 102 may be configured to set, with respect to each training set of a first predetermined number of training sets, a corresponding number of feature extraction layers respectively, and configured to extract, with respect to each sample image, features of the sample image by using feature extraction layers set with respect to a training set to which the sample image belongs, to obtain extracted features of the sample image. At least two of the first predetermined number of training sets at least partially overlap.

Setting the corresponding number of feature extraction layers respectively with respect to each training set of the first predetermined number of training sets refers to that the numbers of feature extraction layers set for each training set among the first predetermined number of training sets may be different.

It is assumed the first predetermined number is N, and thus the first predetermined number of training sets may include a training set 1, . . . , and a training set N. At least two of the first predetermined number of training sets at least partially overlapping refers to that at least two training sets among the N training sets have a same sample image. That is, at least two training sets among the N training sets have cross data.

In an example, the feature extraction layer may be a convolutional layer of a convolutional neural network. It should be understood by those skilled in the art the feature extraction layer may have other structures, which are not described herein.

The feature fusion unit 104 may be configured to set, with respect to each training set of the first predetermined number of training sets, a corresponding number of feature fusion layers respectively, and configured to perform, with respect to each sample image, a fusion on the extracted features of the sample image by using feature fusion layers set with respect to a training set to which the sample image belongs, to obtain fused features of the sample image.

Setting the corresponding number of feature fusion layers respectively with respect to each training set of the first predetermined number of training sets refers to that the numbers of the feature fusion layers set for each training set among the first predetermined number of training sets may be different.

In an example, the feature fusion layer may be a full connection layer of the convolutional neural network. It should be understood by those skilled in the art that the feature fusion layer may have other structures, which are not described herein.

The loss determination unit 106 may be configured to set, with respect to each training set of the first predetermined number of training sets, a loss determination layers, and configured to calculate, with respect to each sample image, a loss function of the sample image based on the fused features of the sample image by using a loss determination layer set with respect to a training set to which the sample image belongs, and to train the classification model based on the loss function.

It should be noted that, in training the classification model using the sample image, the loss determination unit 106 calculates a loss function of the sample image by using a loss determination layer set with respect to a training set to which the sample image belongs, thereby ensuring that the sample image can be classified correctly. In addition, the loss determination unit 106 trains the classification model by performing error back transmission based on a loss value of the loss function calculated by using the loss determination layer. In an example, the loss function may be a softmax loss function. In addition, other examples of the loss function may be conceived by those skilled in the art, which are not described herein.

In the apparatus 100 for training a classification model according to the embodiment of the present disclosure, the first predetermined number of training sets share at least one layer of the corresponding number of feature fusion layers and feature extraction layers set with respect to each training set respectively. In combining the first predetermined number of training sets to form a larger training set, the first predetermined number of training sets share at least one layer of the feature fusion layers and the feature extraction layers set with respect to each training set respectively, so that cross data among different training sets can be classified correctly. Taking a training set including facial data as an example, the first predetermined number of training sets share at least one layer of the feature fusion layers and the feature extraction layers set with respect to each training set respectively, so that a same human face existing in different training sets can be classified correctly.

Figure 2:
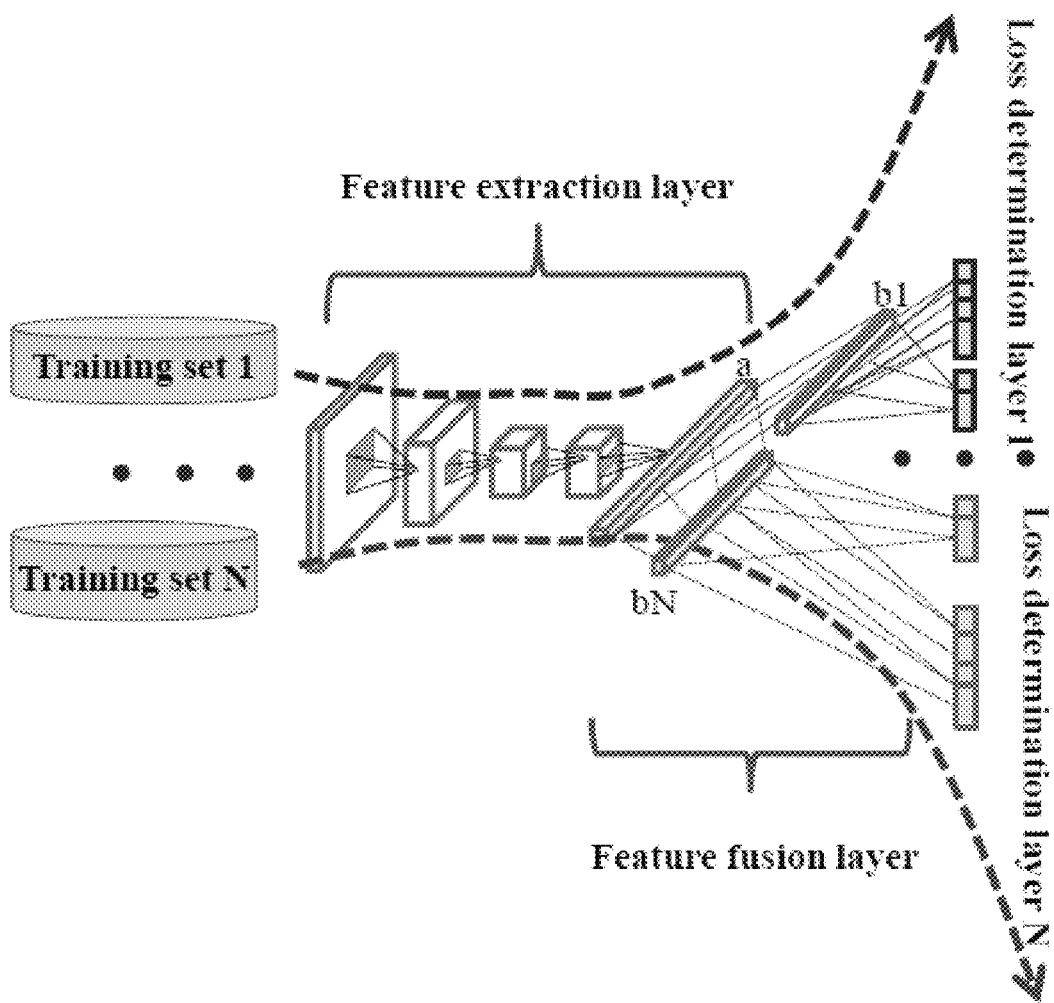
FIG. 2 is a structural diagram schematically showing a configuration example of an apparatus for training a classification model according to an embodiment of the present disclosure.

FIG. 2 is a structural diagram schematically showing a configuration example of the apparatus 100 for training a classification model according to an embodiment of the present disclosure.

As shown in FIG. 2, there exists a first predetermined number (N) of training sets, i.e., a training set 1, . . . , and a training set N. For simplicity, FIG. 2 shows feature extraction layers shared by the N training sets, and further schematically shows a feature fusion layer a shared by the N training sets. In addition, FIG. 2 schematically shows loss determination layers corresponding to the N training sets respectively, that is, a loss determination layer 1, . . . , and a determination layer N.

Taking a training set including facial data as an example, if multiple training sets have much same facial data (that is, the training sets have cross data) and the multiple training sets are regarded as one training set as in the conventional technology, the same human face in different training sets will be regarded as different label data, resulting in that the training model is difficult to converge and has degraded model performance.

According to the above description, in the apparatus 100 for training a classification model according to the embodiment of the present disclosure, different training sets share at least one layer of feature fusion layers and feature extraction layers set with respect to each training set respectively, so that cross data among different training sets can be classified correctly. That is, in the apparatus 100 for training a classification model according to the embodiment of the present disclosure, multiple training sets can be trained simultaneously, so that cross data among different training sets can be classified correctly.

Preferably, in the apparatus 100 for training a classification model according to the embodiment of the present disclosure, the feature fusion layers set with respect to each training set respectively include multiple feature fusion layers, and the first predetermined number of training sets do not share at least one of the multiple feature fusion layers set with respect to each training set respectively. That is, at least one of the feature fusion layers set with respect to each training set is not shared by the first predetermined number of training sets, and features outputted from the feature fusion layer(s) which is not shared are outputted to a loss determination layer set with respect to each training set and corresponding to the training set. FIG. 2 schematically shows that the N training sets do not share a feature fusion layer b1 set for the training set 1 to a feature fusion layer bN set for the training set N. Features outputted from the feature fusion layer b1 to the feature fusion layer bN which are not shared are outputted to the loss determination layer 1 to the loss determination layer N respectively.

Preferably, the apparatus 100 for training a classification model according to the embodiment of the present disclosure further includes a local area obtaining unit configured to obtain, with respect to each sample image, a second predetermined number of local areas of the sample image. Each local area is a part of a global area of the sample image. The feature extraction unit 102 may be configured to set corresponding numbers of feature extraction layers with respect to the global area and each predetermined local area respectively, to extract a global feature of the global area and a local feature of each predetermined local area. The first predetermined number of training sets share at least one layer of feature extraction layers set with respect to the global area of the sample image in each training set.

Setting the corresponding number of feature extraction layers with respect to the global area and each predetermined local area respectively refers to that the number of feature extraction layers set for the global area and each predetermined local area may differ from each other.

Preferably, the first predetermined number of training sets further share at least one layer of feature extraction layers set with respect to at least one of predetermined local areas of a sample image in each training set.

It should be understood by those skilled in the art that, features regarding the local area obtaining unit and features regarding the multiple feature fusion layers may be combined, and such combination falls within the scope of the present disclosure.

In an example, the global area is a whole area of the sample image, and the local area is a part of the whole area of the sample image.

It is assumed that the sample image is a facial image. The local area obtaining unit may divide a human face into a second predetermined number of facial image blocks according to five pieces of key point information about the human face (two eyes, a nose, and two mouth corners), so as to obtain local areas for each sample image, such as an area including eyes, an area including the nose and an area including the mouth. The sample image may be the human face or a license plate. The local area obtaining unit may perform the similar processing on an image other than the human face image (such as a license plate image).

The feature extracting unit 102 extracts global features of the global area by using the feature extraction layer set with respect to the global area, and extracts local features of each predetermined local area by using the feature extraction layers set with respect to each predetermined local area. The first predetermined number of training sets share at least one of the feature extraction layers set with respect to the global area of the sample image in each training set, so that cross data among different training sets can be classified correctly. In addition, the first predetermined number of training sets further share at least one of the feature extraction layers set with respect to at least one of the predetermined local areas of the sample image in each training set, so that cross data among different training sets can be classified more accurately.

Figure 3:
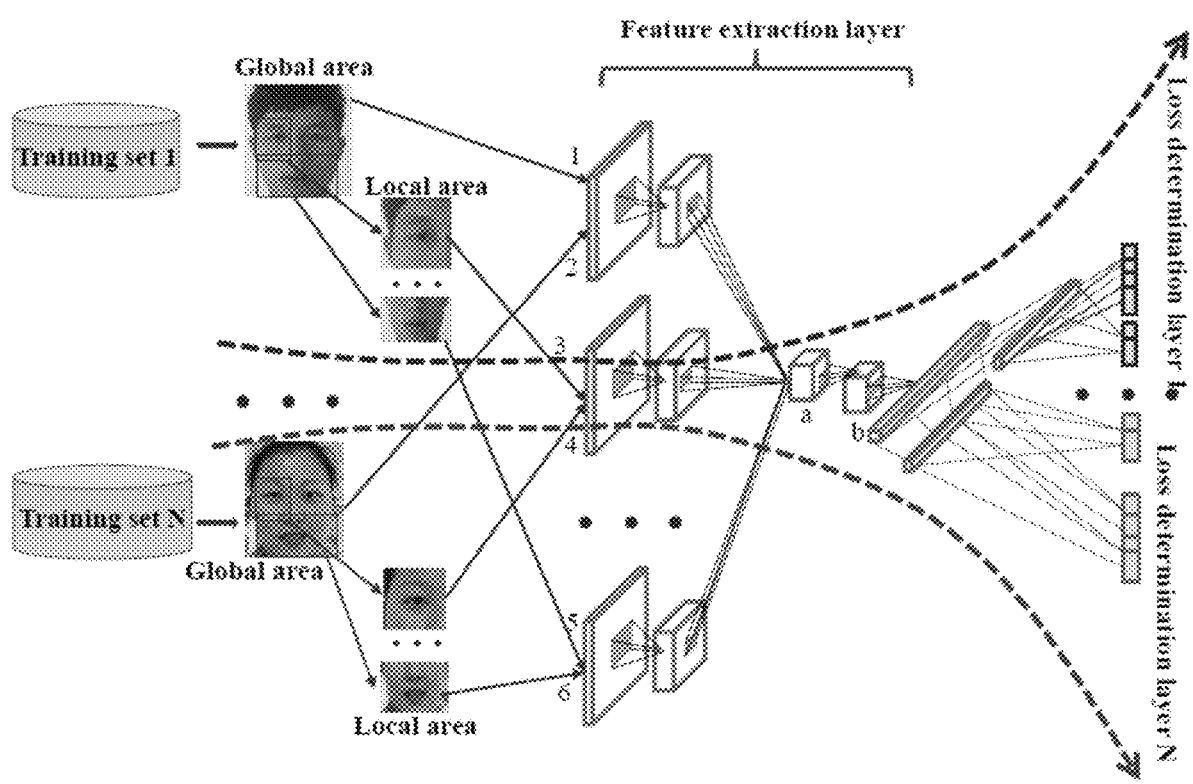
FIG. 3 is a structural diagram schematically showing another configuration example of the apparatus for training a classification model according to the embodiment of the present disclosure.

FIG. 3 is a structural diagram schematically showing another configuration example of the apparatus 100 for training a classification model according to the embodiment of the present disclosure.

As shown in FIG. 3, there exists a training set 1, . . . , and a training set N. FIG. 3 shows a man facial image from the training set 1 and a lady facial image from the training set N, as examples of the sample image. In an example, the sample image may be selected in the following manner. A batch of facial images are randomly selected from different training sets, and the number of images from each training set included in the batch of facial images is determined based on a size of the training set. For example, a ratio of the number of sample images from the training set 1 to the number of sample images from the training set N is 1:P, and thus a ratio of the number of images from the training set 1 included in the batch of facial images to the number of images from the training set N included in the batch of facial images is 1:P.

As shown in FIG. 3, the local area including eyes, the local area including the nose and the mouth and so on are obtained from each sample image. In addition, corresponding number of feature extraction layers are set with respect to the global area and each predetermined local area respectively.

For simplicity, illustrative rather than restrictive, the N training sets in FIG. 3 share the feature extraction layers set with respect to the global area and each predetermined local area of the sample image in each training set. In an example, as shown by arrow 1 and arrow 2 in FIG. 3, the global areas of the training set 1 and the training set N share the feature extraction layer set with respect to the global area. As shown by arrow 3 and arrow 4 in FIG. 3, the local areas including eyes of the sample images from the training set 1 and the training set N share the feature extraction layer set with respect to the local area. As shown by arrow 5 and arrow 6 in FIG. 3, the local areas including the nose and the mouth of the sample images from the training set 1 and the training set N share the feature extraction layer set with respect to the local area.

Preferably, in the feature extraction unit 102, the global area and a second predetermined number of predetermined local areas share at least one of the feature extraction layers set with respect to the global area and each predetermined local area respectively, so that the global feature and each local feature can be combined in the shared at least one layer, thereby obtaining combined features of each sample image. In an example, the global feature and each local feature are combined in the shared at least one layer, so that the local features of each local area supplement for the global feature.

In the conventional technology, according to a classification model performing classification by using multiple image blocks of a humane face (that is, the local areas described above), one classification model is trained for each image block, and M classification models are required to be trained for M image blocks; the calculation amount is great and the real time performance of the system is influenced. In addition, in a case that the application scenario has great gesture change, a low resolution and poor quality (for example, due to dark lamplight) and so on, the classification performance will be degraded significantly.

In the apparatus 100 for training a classification model according to the embodiment of the present disclosure, the global feature and each local feature are combined in the at least one feature extraction layer shared by the global area and the second predetermined number of predetermined local areas, and the features of each sample image can be characterized accurately by the features combined from the global feature and each local feature of the sample image, thereby facilitating performing accurate classification on the sample image and obtaining a more robust classification model. That is, a better classification performance can be obtained even in the application scenario having great gesture change, a low resolution and poor quality. In addition, a training speed can be improved.

As shown in FIG. 3, the global area, the local area including eyes and the local area including the nose and the mouth and so on of the sample image share feature extraction layers a and b among the feature extraction layers set with respect to the global area and each predetermined local area respectively. In addition, the global area, the local area including eyes and the local area including the nose and the mouth and so on of the sample image may share one of the feature extraction layers a and b among the feature extraction layers set with respect to the global region and each predetermined local area respectively.

Preferably, the loss determination unit 106 is configured to calculate, with respect to each sample image, the loss function of the sample image based on the combined features of the sample image by using a loss determination layer set with respect to a training set to which the sample image belongs, and to train the classification model based on the loss function. As described above, the combined features of the sample image include not only the global feature but also the local features, and thus the features of the sample image can be characterized accurately. Fusion is performed on the combined features of the sample image by the feature fusion layer to obtain the fused feature of the sample image, and the loss function of the sample image is calculated based on the fused feature of the sample image.

FIG. 3 schematically shows loss determination layers corresponding to the N training sets respectively, that is, a loss determination layer 1, . . . , and a loss determination layer N. As described above, in training the classification model by using the sample image, the loss function of the sample image is calculated by the loss determination layer set with respect to the training set to which the sample image belongs, thereby ensuring that the sample image can be classified accurately.

Preferably, the second predetermined number of local areas have complementary information about the global area. In this case, the global feature can be supplemented more comprehensively by the local features of the local areas, and the features of each sample image can be characterized more accurately by the features combined form the global feature and each local feature of the sample image, thereby facilitating performing classification on the sample images more accurately.

Corresponding to the embodiments of the apparatus for training the classification model, embodiments of a method for training a classification model are provided according to the present disclosure.

Figure 4:
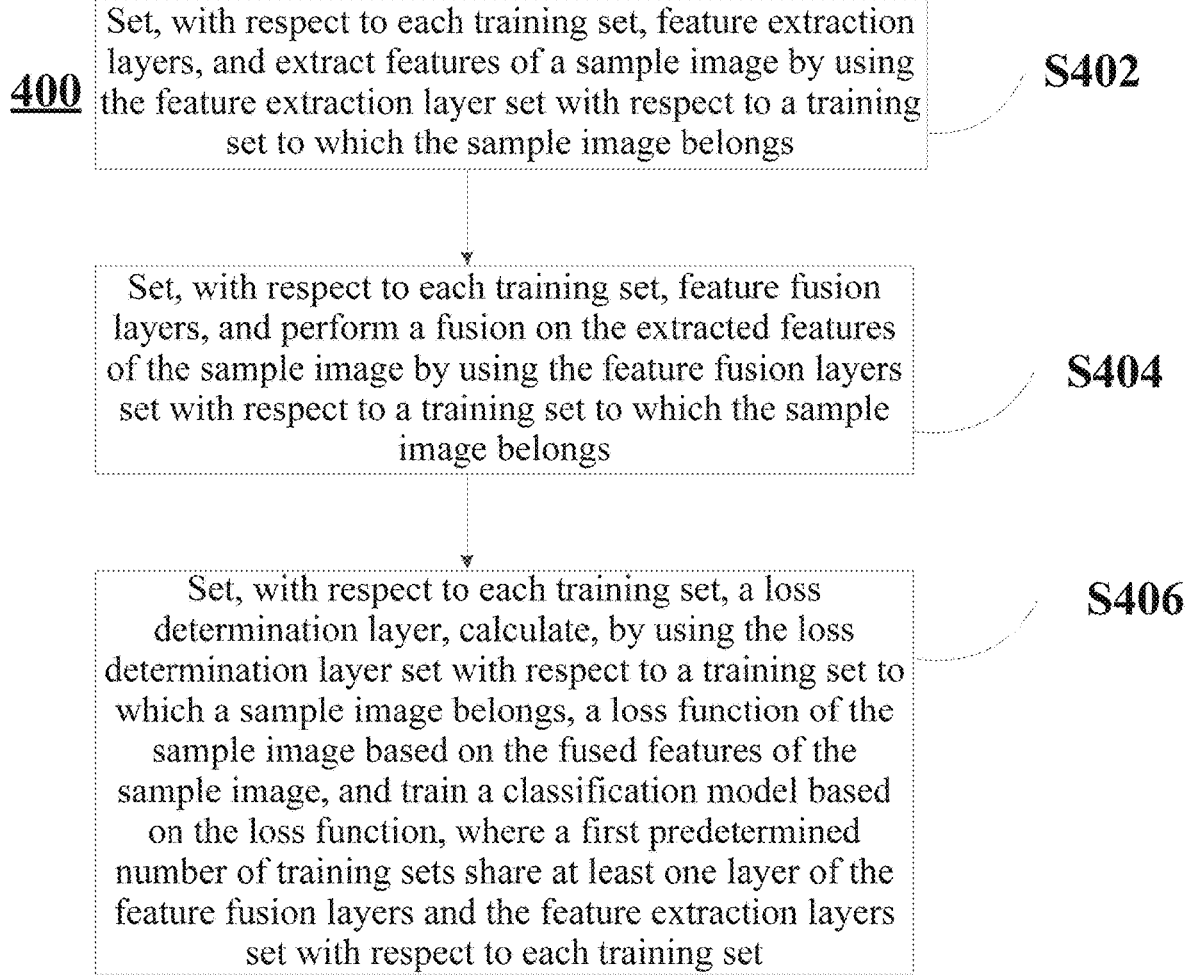
FIG. 4 is a flowchart of a flow example of a method for training a classification model according to an embodiment of the present disclosure.

FIG. 4 is a flowchart showing a flow example of a method 400 for training a classification model according to an embodiment of the present disclosure.

As shown in FIG. 4, the method 400 for training a classification model according to the embodiment of the present disclosure includes a feature extraction step S402, a feature fusion step S404 and a loss determination step S406.

In the feature extraction step S402, a corresponding number of feature extraction layers are set with respect to each training set of a first predetermined number of training sets, and with respect to each sample image, features of the sample image are extracted by using feature extraction layers set with respect to a training set to which the sample image belongs, to obtain extracted features of the sample image. At least two of the first predetermined number of training sets at least partially overlap.

In an example, the feature extraction layer may be a convolutional layer of a convolutional neural network. It should be understood by those skilled in the art that the feature extraction layer may have other structures, which are not described herein.

In the feature fusion step S404, a corresponding number of fusion layers are set with respect to each training set of the first predetermined number of training sets, and with respect to each sample image, fusion is performed on the extracted features of the sample image by using feature extraction layers set with respect to a training set to which the sample image belongs, thereby obtaining the fused feature of the sample image.

In an example, the feature fusion layer may be a full connection layer of the convolutional neural network. It should be understood by those skilled in the art that, the feature fusion layer may have other structures, which are not described herein.

In the loss determination step S406, a loss determination layer is set with respect to each training set of the first predetermined number of training set, and with respect to each sample image, a loss function of the sample image is calculated based on the fused feature of the sample image by using a loss determination layer set with respect to a training set to which the sample image belongs, and the classification model is trained based on the loss function.

According to the method 400 for training a classification model according to the embodiment of the present disclosure, the first predetermined number of training sets share at least one layer of the corresponding number of feature fusion layers and feature extraction layers set with respect to each training set respectively. In combining the first predetermined number of training sets to form a larger training set, the first predetermined number of training sets share at least one layer of the feature fusion layers and the feature extraction layers set with respect to each training set respectively, so that cross data among different training sets can be classified correctly. Taking a training set including facial data as an example, the first predetermined number of training sets share at least one layer of the feature fusion layers and the feature extraction layers set with respect to each training set respectively, so that a same human face existing in different training sets can be classified correctly.

Taking a training set including facial data as an example, if multiple training sets have much same facial data (that is, the training sets have cross data) and the multiple training sets are regarded as one training set as in the conventional technology, the same human face in different training sets will be regarded as different label data, resulting in that the training model is difficult to converge and has degraded model performance.

According to the above description, in the method 400 for training a classification model according to the embodiment of the present disclosure, different training sets share at least one layer of the feature fusion layers and the feature extraction layers set with respect to each training set respectively, so that cross data among different training sets can be classified correctly. That is, according to the method 400 for training a classification model according to the embodiment of the present disclosure, multiple training sets can be trained simultaneously, so that cross data among different training sets are classified correctly.

Preferably, in the method 400 for training a classification model according to the embodiment of the present disclosure, the feature fusion layers set for each training set respectively include multiple feature fusion layers, and the first predetermined number of training sets do not share at least one layer of the multiple feature fusion layers set with respect to each training set respectively. That is, at least one feature fusion layer among the feature fusion layers set with respect to each training set is not shared by the first predetermined number of training sets, and features outputted from the feature fusion layer which is not shared are outputted to the loss determination layer set for each training set and corresponding to the training set.

Preferably, the method 400 for training a classification model according to the embodiment of the present disclosure further includes a local area obtaining step. In the local area obtaining step, with respect to each sample image, a second predetermined number of local areas of the sample image are obtained. Each local area is a part of a global area of the sample image. In the feature extraction step S402, corresponding numbers of feature extraction layers are set with respect to the global area and each predetermined local area respectively, to extract a global feature of the global area and a local feature of each predetermined local area respectively. The first predetermined number of training sets share at least one layer of feature extraction layers set with respect to the global area of the sample image in each training set.

Preferably, the first predetermined number of training sets further share at least one layer of feature extraction layers set with respect to at least one of the predetermined local areas of the sample image in each training set.

It should be understood by those skilled in the art that features regarding the local area obtaining step and features regarding the multiple feature fusion layers may be combined, and such combination falls within the scope of the present disclosure.

In an example, the global area is a whole area of the sample image, and the local area is a part of the whole area of the sample image.

In the feature extraction step S402, the global feature of the global area is extracted by using the feature extraction layers set with respect to the global area, and the local feature of each predetermined local area is extracted by using the feature extraction layers set with respect to each predetermined local area respectively. The first predetermined number of training sets share at least one of the feature extraction layers set with respect to the global area of the sample image in each training set, so that cross data among different training sets can be classified correctly. In addition, the first predetermined number of training sets further share at least one of the feature extraction layers set with respect to at least one of the predetermined local areas of the sample image in each training set, so that cross data among different training sets can be classified more accurately.

Preferably, in the feature extraction step S402, the global area and the second predetermined number of local areas share at least one of the feature extraction layers set with respect to the global area and each predetermined local area, so that the global feature and each local feature are combined in the shared at least one layer, thereby obtaining the combined feature of each sample image. In an example, the global feature and each local feature are combined in the shared at least one layer, so that the local feature of each local area can supplement for the global feature.

In the conventional technology, according to a classification model performing classification by using multiple image blocks of a humane face (that is, the local areas described above), one classification model is trained for each image block, and M classification models are required to be trained for M image blocks; the calculation amount is great and the real time performance of the system is influenced. In addition, in a case that the application scenario has great gesture change, a low resolution and poor quality (for example, due to dark lamplight) and so on, the classification performance will be degraded significantly.

In the method 400 for training a classification model according to the embodiment of the present disclosure, the global feature and each local feature are combined in the at least one feature extraction layer shared by the global area and the second predetermined number of predetermined local areas, and the features of each sample image can be characterized accurately by the features combined from the global feature and each local feature of the sample image, thereby facilitating performing accurate classification on the sample image and obtaining a more robust classification model. That is, a better classification performance can be obtained even in the application scenario having great gesture change, a low resolution and poor quality. In addition, a training speed can be improved.

Preferably, in the loss determination step S406, with respect to each sample image, a loss function of the sample image is calculated based on the combined feature of the sample image by using the loss determination layer set with respect to a training set to which the sample image belongs, and the classification model is trained based on the loss function. As described above, the combined features of the sample image include not only the global feature but also the local features, and thus the features of the sample image can be characterized correctly. Fusion is performed on the combined feature of the sample image by using the feature fusion layer to obtain the fused feature of the sample image, and the loss function of the sample image is calculated based on the fused feature of the sample image.

Preferably, the second predetermined number of local areas have complementary information about the global area. In this case, the global feature can be supplemented more comprehensively by the local features of the local areas, and the features of each sample image can be characterized more accurately by the features combined from the global feature and each local feature of the sample image, thereby facilitating performing classification on the sample images more accurately.

Figure 5:
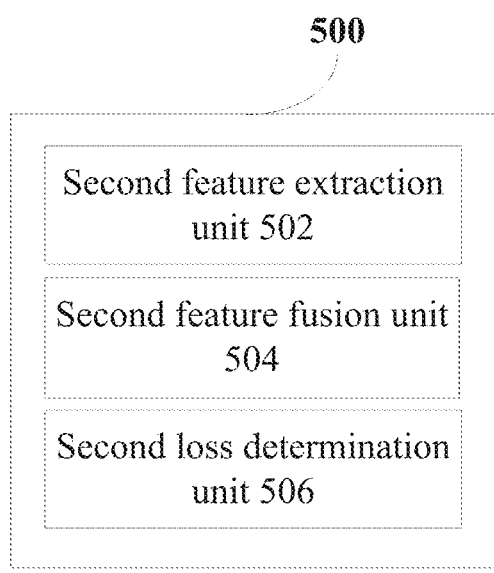
FIG. 5 is a block diagram of an example of functional configurations of an apparatus for performing classification by using a pre-trained classification model according to an embodiment of the present disclosure.

An apparatus for performing classification by using a classification model is further provided according to the present disclosure. FIG. 5 is a block diagram of an example of functional configurations of an apparatus 500 for performing classification by using a pre-trained classification model according to an embodiment of the present disclosure. As shown in FIG. 5, the apparatus 500 for performing classification by using the pre-trained classification model according to the embodiment of the present disclosure includes a second feature extraction unit 502, a second feature fusion unit 504 and a second loss determination unit 506. The pre-trained classification model may be obtained by training by using the apparatus 100 for training a classification model or the method 400 for training a classification model according to the above embodiments of the present disclosure. In addition, the pre-trained classification model may be the classification model trained in FIGS. 1 to 4 for example, which is not limited herein.

The second feature extraction unit 502 may be configured to extract features of an image to be classified, by using corresponding number of feature extraction layers set with respect to each training set of a first predetermined number of training sets in the classification model, so as to obtain the extracted features of the image to be classified.

In an embodiment, the feature extraction layer may be a convolutional layer of a convolutional neural network. It should be understood by those skilled in the art that the feature extraction layer may have other structures, which are not described herein.

The second feature fusion unit 504 may be configured to perform a fusion on the extracted feature of the image to be classified by using the feature fusion layers set with respect to each training set of the first predetermined number of training sets in the classification model, thereby obtaining the fused features of the image to be classified.

In an embodiment, the feature fusion layer may be a full connection layer of the convolutional neural network. It should be understood by those skilled in the art that the feature fusion layer may have other structures, which are not described herein.

The second loss determination unit 506 may be configured to calculate a loss function of the image to be classified based on the fused feature of the image to be classified by using the loss determination layer sets with respect to the first predetermined number of training sets in the classification model, and classify the image to be classified based on the loss function. In an embodiment, the second loss determination unit 506 may select a loss function with the minimum value from the loss functions calculated for the loss determination layers set for the first predetermined number of training sets, and use a type corresponding to the loss function with the minimum value as a type to which the image to be classified belongs.

In the classification model, the first predetermined number of training sets share at least one layer of the feature fusion layers and the feature extraction layers set with respect to each training set respectively. In this way, cross data among different training sets can be classified correctly.

According to the above description, in the pre-trained classification model, different training sets share at least one layer of the feature fusion layers and the feature extraction layers set with respect to each training set respectively, so that cross data among different training sets can be classified correctly. Therefore, with the apparatus 500 performing classification by using the pre-trained classification model according to the embodiment of the present disclosure, the image to be classified can be classified correctly.

Preferably, the apparatus 500 for performing classification by using the pre-trained classification model according to the embodiment of the present disclosure further includes a second local area obtaining unit. The second local area obtaining unit is configured to obtain a second predetermined number of local areas of the image to be classified. Each local area is a part of a global area of the image to be classified. The second feature extraction unit 502 is further configured to extract the global feature of the global area and the local feature of each predetermined local area by using corresponding number of feature extraction layers set with respect to the global area and the each local area in the classification model. In the classification model, the global area and the second predetermined number of predetermined local areas share at least one layer of the feature extraction layers set with respect to the global area and each predetermined local area respectively, so that the global feature and each local feature are combined in the shared at least one layer, thereby obtaining the combined feature of the image to classified. The second loss determination unit 506 is further configured to calculate a loss function of the image to be classified based on the combined feature of the image to be classified by using the loss determination layers set with respect to the first predetermined number of training sets in the classification model, and classify the image to be classified based on the loss function.

Corresponding to the apparatus for performing classification by using the classification model, embodiments of a method for performing classification by using a classification model are further provided according to the present disclosure.

FIG. 6 is a flowchart showing a flow example of a method 600 for performing classification by using a pre-trained classification model according to an embodiment of the present disclosure.

As shown in FIG. 6, the method 600 for performing classification by using the pre-trained classification model according to the embodiment of the present disclosure includes: second feature extraction step S602, second feature fusion step S604 and second loss determination step S606. The pre-trained classification model may be obtained by training according to the apparatus 100 for training a classification model or the method 400 for training a classification model according to the above embodiments. In addition, the pre-trained classification model may be the classification models trained in FIGS. 1 to 4 for example, which is not limited herein.

In the second feature extraction step S602, features of an image to be classified are extracted by using corresponding number of feature extraction layers set with respect to each training set of the first predetermined number of training sets in the classification model, to obtain the extracted features of the image to be classified.

In an embodiment, the feature extraction layer may be a convolutional layer of a convolutional neural network. It should be understood by those skilled in the art that the feature extraction layer may have other structures, which are not described herein.

In the second feature fusion step S604, fusion is performed on the extracted features of the image to be classified by using the feature fusion layers set with respect to each training set of the first predetermined number of training sets in the classification model, to obtain the fused feature of the image to be classified.

In an example, the feature fusion layer may be a full connection layer of the convolutional neural network. It should be understood by those skilled in the art that the feature fusion layer may have other structures, which are described herein.

In the second loss determination step S606, a loss function of the image to be classified is calculated based on the fused feature of the image to be classified by using the loss determination layers set with respect to the first predetermined number of training sets in the classification model, and the image to be classified is classified based on the loss function. In an embodiment, in the second loss determination step S606, a loss function with the minimum value may be selected from the loss functions calculated for the loss determination layers set with respect to the first predetermined number of training sets, and a type corresponding to the loss function with the minimum value is used as a type to which the image to be classified belongs.

In the classification model, the first predetermined number of training sets share at least one layer of the feature fusion layers and the feature extraction layers set for each training set. In the classification model, the first predetermined number of training sets share at least one layer of the feature fusion layers and the feature extraction layers set for each training set, so that cross data among different training sets can be classified correctly.

According to the above description, in the pre-trained classification model, different training sets share at least one layer of the feature fusion layers and the feature extraction layers set with respect to each training set, so that cross data among different training sets can be classified correctly. Therefore, with the method 600 for performing classification by using the pre-trained classification model according to the embodiment of the present disclosure, the image to be classified can be classified correctly.

Preferably, the method 600 for performing classification by using the pre-trained classification model according to the embodiment of the present disclosure further includes second local area obtaining step. In the second local area obtaining step, a second predetermined number of local areas of the image to be classified are obtained. Each local area is a part of the whole area of the image to be classified. In the second feature extraction step S602, the global feature of the global area and the local feature of each predetermined local area are respectively extracted by using the corresponding number of feature extraction layers set with respect to the global area and each local area in the classification model. In the classification model, the global area and the second predetermined number of predetermined local areas share at least one layer of the feature extraction layers set with respect to the global area and the each predetermined local area, so that the global feature and each local feature are combined in the shared at least one layer, thereby obtaining the combined feature of the image to be classified. In the second loss determination step S606, the loss function of the image to be classified is calculated based on the combined feature of the image to be classified by using the loss determination layers set with respect to the first predetermined number of training sets in the classification model, and the image to be classified is classified based on the loss function.

It should be noted that, although functional configurations and operations of the apparatus and method for training a classification model, and the apparatus and method for performing classification by using a classification model according to the embodiment of the present disclosure are described above, the above description is only schematic rather than restrictive. Those skilled in the art may modify the above embodiments according to the principles of the present disclosure, for example, adding, deleting or combining the functional modules and operations in the embodiments, and such modification falls within the scope of the present disclosure.

In addition, it should be noted that, the method embodiments correspond to the apparatus embodiments, and for the content not described in detail in the method embodiments, one may refer to corresponding description in the apparatus embodiments. The details are not repeated herein.

In addition, a storage medium and a program product are further provided according to the present disclosure. Machine executable instructions in the storage medium and the program product according to the embodiment of the present disclosure may be executed to perform the method described above. For the content not described in detail here, one may refer to the corresponding description above, and the details are not repeated here.

Accordingly, the storage medium for carrying the program product including the machine executable instruction is further included in the present disclosure. The storage medium includes but not limited to a software disk, an optical disk, a magnetic-optical disk, a storage card, and a storage stick and so on.

In addition, it should be noted that the series of processing and the apparatus may be implemented by software and/or firmware. In a case of implementing the present disclosure by software and/or firmware, programs constituting the software are installed to a computer with a dedicated hardware structure (such as a general-purpose personal computer 700 shown in FIG. 7) from the storage medium or the network. When being installed with various types of programs, the computer can perform various functions.

Figure 7:
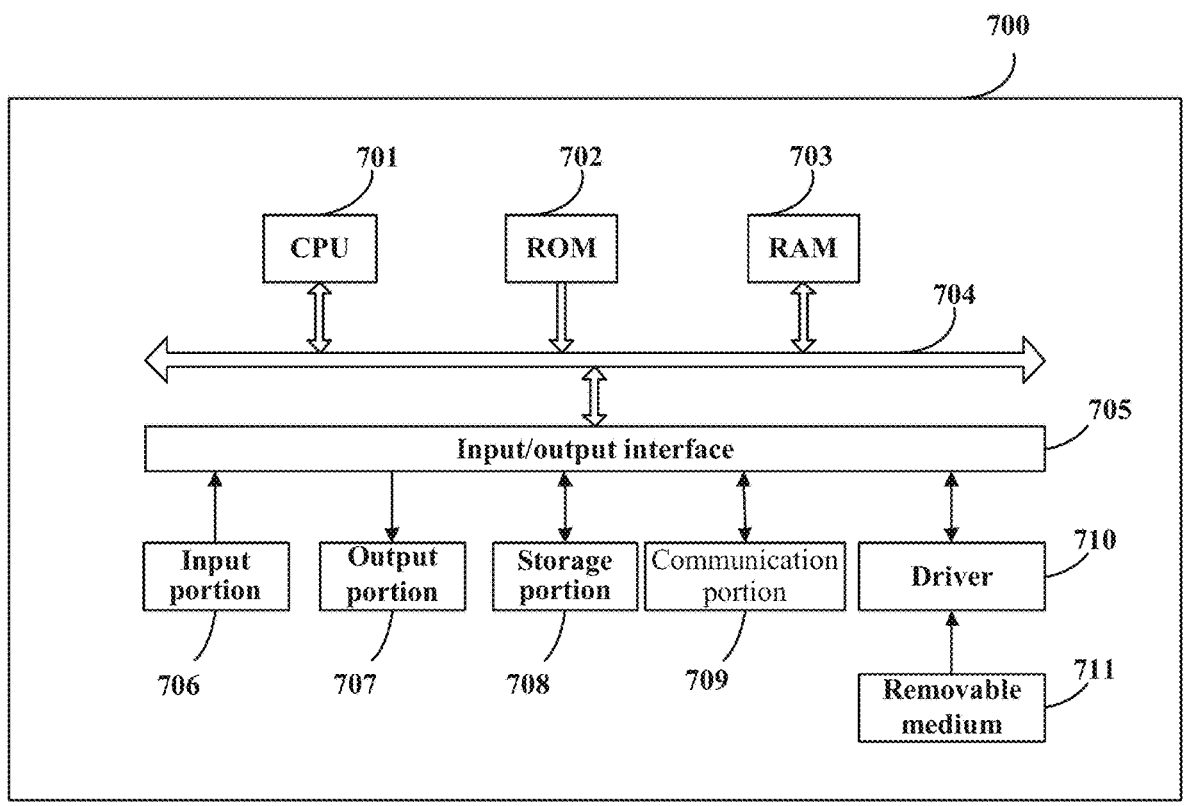
FIG. 7 is a block diagram of a schematic structure of a personal computer which may be adopted in the embodiment of the present disclosure

In FIG. 7, a central processing unit (CPU) 701 performs various processing based on programs stored in a read only memory (ROM) 702 or programs loaded to a random access memory (RAM) 703 from a storage portion 708. In the RAM 703, data required when the CPU 701 performs various processing is stored as needed.

The CPU 701, the ROM 702 and the RANI 703 are connected to each other via a bus 704. An input/output interface 705 is also connected to the bus 704.

The following components are connected to the input/output interface 705: an input portion 706 including a keyboard, a mouse and the like, an output portion 707 including a display such as a Cathode Ray Tube (CRT) and a Liquid Crystal Display (LCD), a loudspeaker and the like, the storage portion 708 including a hard disk and the like, and a communication portion 709 including a network interface card such as a LAN card, a modem and the like. The communication portion 709 performs communication processing via a network such as the Internet.

If necessary, a driver 710 can also be connected to the input/output interface 705. A removable medium 711 such as a magnetic disk, an optical disk, a magneto-optical disk, a semiconductor memory and the like is mounted on the driver 710 as necessary such that a computer program read out therefrom is installed in the storage portion 708.

In a case that the series of processing above is implemented by software, a program constituting the software is installed from the network such as the Internet or the storage medium such as the removable medium 711.

It is understood by those skilled in the art that the storage medium is not limited to the removable medium 711 shown in FIG. 7 in which the program is stored and which is distributed separately from the device so as to provide the program to the user. Examples of the removable medium 711 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 702, the hard disk contained in the storage portion 708 or the like. Herein, the program is stored in the storage medium, and the storage medium is distributed to the user together with the device containing the storage medium.

Preferred embodiments of the present disclosure are described above with reference to the drawings, but the present disclosure is not limited by the preferred embodiments. Those skilled in the art may make various alternations and modifications within the scope of the attached claims, and it should be understood that these alternations and modifications naturally fall within the technical scope of the present disclosure.

For example, multiple functions of one unit in the above embodiments may be achieved by separate devices. Alternatively, multiple functions implemented by multiple units in the above embodiments may be implemented by separate devices. In addition, one of the above functions may be implemented by multiple units. Certainly, such configuration is included in the technical scope of the present disclosure.

In the specification, steps described in the flowchart include not only the processing performed in the described order and in a time order, but also include processing performed in parallel or independently which is unnecessary to be performed in the time order. In addition, for steps processed in the time order, the order may be changed certainly.

In addition, the following configurations are provided according to the technology of the present disclosure.

Item 1. An apparatus for training a classification model, comprising:

a feature extraction unit configured to set, with respect to each training set of a first predetermined number of training sets, a corresponding number of feature extraction layers respectively, and configured to extract, with respect to each sample image, features of the sample image by using feature extraction layers set with respect to a training set to which the sample image belongs, to obtain extracted features of the sample image, wherein at least two of the first predetermined number of training sets at least partially overlap;

a feature fusion unit configured to set, with respect to each training set of the first predetermined number of training sets, a corresponding number of feature fusion layers respectively, and configured to perform, with respect to each sample image, a fusion on the extracted features of the sample image by using feature fusion layers set with respect to a training set to which the sample image belongs, to obtain fused features of the sample image; and a loss determination unit configured to set, with respect to each training set of the first predetermined number of training sets, a loss determination layer, and configured to calculate, with respect to each sample image, a loss function of the sample image based on the fused features of the sample image by using a loss determination layer set with respect to a training set to which the sample image belongs, and to train the classification model based on the loss function, wherein the first predetermined number of training sets share at least one layer of the feature fusion layers and the feature extraction layers which are set with respect to each training set respectively.

Item 2. The apparatus for training a classification model according to Item 1, wherein the feature fusion layers set with respect to each training set respectively comprise a plurality of feature fusion layers, and the first predetermined number of training sets do not share at least one layer of the plurality of feature fusion layers set with respect to each training set respectively.

Item 3. The apparatus for training a classification model according to Item 1, further comprising a local area obtaining unit configured to obtain, with respect to each sample image, a second predetermined number of local areas of the sample image, wherein each local area is a part of a global area of the sample image;

wherein the feature extraction unit is configured to set corresponding numbers of feature extraction layers with respect to the global area and each predetermined local area respectively, to extract a global feature of the global area and a local feature of each predetermined local area respectively, and the first predetermined number of training sets share at least one layer of feature extraction layers set with respect to the global area of the sample image in each training set.

Item 4. The apparatus for training a classification model according to Item 3, wherein the first predetermined number of training sets further share at least one layer of feature extraction layers set with respect to at least one of the predetermined local areas of the sample image in each training set.

Item 5. The apparatus for training a classification model according to Item 3, wherein in the feature extraction unit, the global area and the second predetermined number of predetermined local areas share at least one layer of the corresponding numbers the feature extraction layers set with respect to the global area and each predetermined local area respectively, to combine the global feature and each local feature in the shared at least one layer to obtain combined features of each sample image.

Item 6. The apparatus for training a classification model according to Item 5, wherein the loss determination unit is configured to calculate, with respect to each sample image, the loss function of the sample image based on the combined features of the sample image by using a loss determination layer set with respect to a training set to which the sample image belongs, and to train the classification model based on the loss function.

Item 7. The apparatus for training a classification model according to Item 3, wherein the second predetermined number of local areas have complementary information about the global area.

Item 8. The apparatus for training a classification model according to Item 1, wherein the feature extraction layers are convolutional layers of a convolutional neural network, and the feature fusion layers are full connection layers of the convolutional neural network.

Item 9. A method for training a classification model, comprising:

a feature extraction step of, setting, with respect to each training set of a first predetermined number of training sets, a corresponding number of feature extraction layers respectively, and extracting, with respect to each sample image, features of the sample image respectively by using feature extraction layers set with respect to a training set to which the sample image belongs, to obtain extracted features of the sample image, wherein at least two of the first predetermined number of training sets at least partially overlap;

a feature fusion step of, setting, with respect to each training set of the first predetermined number of training sets, a corresponding number of feature fusion layers respectively, and performing, with respect to each sample image, a fusion on the extracted features of the sample image by using feature fusion layers set with respect to a training set to which the sample image belongs, to obtain fused features of the sample image; and a loss determination step of, setting, with respect to each training set of the first predetermined number of training sets, a loss determination layer respectively, calculating, with respect to each sample image, a loss function of the sample image based on the fused features of the sample image by using a loss determination layer set with respect to a training set to which the sample image belongs, and obtaining the classification model based on the loss function, wherein the first predetermined number of training sets share at least one layer of the feature extraction layers and the feature fusion layers which are set with respect to each training set respectively.

Item 10. The method for training a classification model according to Item 9, wherein the feature fusion layers set with respect to each training set respectively comprise a plurality of feature fusion layers, and the first predetermined number of training sets do not share at least one layer of the plurality of feature fusion layers set with respect to each training set respectively.

Item 11. The method for training a classification model according to Item 9, further comprising:

a local area obtaining step of, obtaining, with respect to each sample image, a second predetermined number of local areas of the sample image, wherein each local area is a part of a global area of the sample image;

wherein in the feature extraction step, a global feature of the global area and a local feature of each predetermined local area are extracted by the corresponding number of feature extraction layers set with respect to the global area and each predetermined local area; and the first predetermined number of training sets share at least one layer of the feature extraction layers set for the global area of the sample image in each training set.

Item 12. The method for training a classification model according to Item 11, wherein the first predetermined number of training sets further share at least one layer of the feature extraction layers set with respect to at least one of the predetermined local areas of the sample image in each training set.

Item 13. The method for training a classification model according to Item 11, wherein in the feature extraction step, the global area and the second predetermined number of predetermined local areas share at least one layer of the feature extraction layers set for the global area and each predetermined local area, and the global feature and each local feature are combined in the shared at least one layer, to obtain combined features of each sample image.

Item 14. The method for training a classification model according to Item 13, wherein in the loss determination step, with respect to each sample image, the loss function of the sample image is calculated based on the combined features of the sample image by using the loss determination layer set with respect to a training set to which the sample image belongs, and the classification model is trained based on the loss function.

Item 15. The method for training a classification model according to Item 11, wherein the second predetermined number of local areas have complementary information about the global area.

Item 16. The method for training a classification model according to Item 9, wherein the feature extraction layers are convolutional layers of a convolutional neural network, and the feature fusion layers are full connection layers of the convolutional neural network.

Item 17. An apparatus for performing classification by using a classification model, comprising:
a second feature extraction unit configured to extract, with a corresponding number of feature extraction layers in the classification model which are set with respect to each training set of a first predetermined number of training sets respectively, features of an image to be classified, to obtain extracted features of the image to be classified;
a second feature fusion unit configured to perform, by using a corresponding number of feature fusion layers in the classification model which are set with respect to each training set of the first predetermined number of training sets respectively, a fusion on the extracted features of the image to be classified, to obtain fused features of the image to be classified; and a second loss determination unit configured to calculate, with loss determination layers in the classification model which are set with respect to the first predetermined number of training sets respectively, a loss function of the image to be classified based on the fused features of the image to be classified, and to classify the image to be classified based on the loss function, wherein in the classification model, the first predetermined number of training sets share at least one layer of the feature fusion layers and the feature extraction layers which are set with respect to each training set respectively.

Item 18. The apparatus for performing classification by using a classification model according to Item 17, further comprising: a second local area obtaining unit configured to obtain a second predetermined number of local areas of the image to be classified, wherein each local area is a part of a global area of the image to be classified,
wherein the second feature extraction unit is further configured to extract a global feature of the global area and a local feature of each predetermined local area by using the feature extraction layers set with respect to the global area and each local area in the classification model, and in the classification model, the global area and the second predetermined number of predetermined local area share at least one layer of the feature extraction layers set with respect to the global area and each predetermined local area respectively, so that the global feature and each local feature are combined in the at least one layer that is shared, to obtain combined features of the image to be classified, and
the second loss determination unit is further configured to calculate a loss function of the image to be classified based on the combined features of the image to be classified by using the loss determination layers set with respect to the first predetermined number of training sets in the classification model, and classify the image to be classified based on the loss function.

The invention claimed is:

1. An apparatus for training a classification model, comprising:
a memory; and
a processor coupled to the memory, the processor being configured to:
set, with respect to each training set of a first predetermined number of training sets, a corresponding number of feature extraction layers respectively, and extract, with respect to each sample image, features of the sample image by using feature extraction layers set with respect to a training set to which the sample image belongs, to obtain extracted features of the sample image, wherein at least two of the first predetermined number of training sets at least partially overlap, and indexes of feature extraction layers set respectively for each training set are different;
set, with respect to each training set of the first predetermined number of training sets, a corresponding number of initial fully connected layers and a final fully connected layer respectively, and perform, with respect to each sample image, a fusion on the extracted features of the sample image by using the initial fully connected layers and the final fully connected layer set with respect to a training set to which the sample image belongs, to obtain fused features of the sample image, wherein the initial fully connected layers set for each training set are connected between the feature extraction layers and the final fully connected layer set for the training set, and the indexes of initial fully connected layers set for each training set respectively are different; and
set, with respect to each training set of the first predetermined number of training sets, a loss determination layer, and calculate, with respect to each sample image, a loss function of the sample image based on the fused features of the sample image by using a loss determination layer set with respect to a training set to which the sample image belongs, and to train the classification model based on the loss function, wherein the loss determination layer set for each training set is connected to the final fully connected layer set for the training set, and the loss determination layer set respectively for each training set is different,
wherein the first predetermined number of training sets share at least one layer of the initial fully connected layers and the feature extraction layers which are set with respect to each training set respectively.

2. The apparatus for training a classification model according to claim 1, wherein the processor is further configured to obtain, with respect to each sample image, a second predetermined number of local areas of the sample image, wherein each local area is a part of a global area of the sample image;
wherein the processor is configured to set corresponding numbers of feature extraction layers with respect to the global area and each predetermined local area respectively, to extract a global feature of the global area and a local feature of each predetermined local area respectively, and
the first predetermined number of training sets share at least one layer of feature extraction layers set with respect to the global area of the sample image in each training set.

3. The apparatus for training a classification model according to claim 2, wherein the first predetermined number of training sets further share at least one layer of feature extraction layers set with respect to at least one of the predetermined local areas of the sample image in each training set.

4. The apparatus for training a classification model according to claim 2, wherein
in obtaining the extracted features of the sample image, the global area and the second predetermined number of predetermined local areas share at least one layer of the corresponding numbers of feature extraction layers set with respect to the global area and each predetermined local area respectively, to combine the global feature and each local feature in the shared at least one layer to obtain combined features of each sample image.

5. The apparatus for training a classification model according to claim 4, wherein the processor is configured to calculate, with respect to each sample image, the loss function of the sample image based on the combined features of the sample image by using a loss determination layer set with respect to a training set to which the sample image belongs, and to train the classification model based on the loss function.

6. The apparatus for training a classification model according to claim 2, wherein the second predetermined number of local areas have complementary information about the global area.

7. The apparatus for training a classification model according to claim 1, wherein the feature extraction layers are convolutional layers of a convolutional neural network.

8. A method for training a classification model, comprising:
setting, with respect to each training set of a first predetermined number of training sets, a corresponding number of feature extraction layers respectively, and extracting, with respect to each sample image, features of the sample image respectively by using feature extraction layers set with respect to a training set to which the sample image belongs, to obtain extracted features of the sample image, wherein at least two of the first predetermined number of training sets at least partially overlap, and indexes of feature extraction layers set respectively for each training set are different;
setting, with respect to each training set of the first predetermined number of training sets, a corresponding number of initial fully connected layers and a final fully connected layer respectively, and performing, with respect to each sample image, a fusion on the extracted features of the sample image by using the initial fully connected layers and the final fully connected layer set with respect to a training set to which the sample image belongs, to obtain fused features of the sample image, wherein the initial fully connected layers set for each training set are connected between the feature extraction layers and the final fully connected layer set for the training set, and the indexes of initial fully connected layers set for each training set respectively are different; and
setting, with respect to each training set of the first predetermined number of training sets, a loss determination layer respectively, calculating, with respect to each sample image, a loss function of the sample image based on the fused features of the sample image by using a loss determination layer set with respect to a training set to which the sample image belongs, and training the classification model based on the loss function, wherein the loss determination layer set for each training set is connected to the final fully connected layer set for the training set, and the loss determination layer set respectively for each training set is different,
wherein the first predetermined number of training sets share at least one layer of the initial fully connected layers and the feature extraction layers which are set with respect to each training set respectively.

9. The method for training a classification model according to claim 8, further comprising:
obtaining, with respect to each sample image, a second predetermined number of local areas of the sample image, wherein each local area is a part of a global area of the sample image;
wherein in obtaining the extracted features of the sample image, a global feature of the global area and a local feature of each predetermined local area are extracted by the corresponding number of feature extraction layers set with respect to the global area and each predetermined local area; and
the first predetermined number of training sets share at least one layer of the feature extraction layers set for the global area of the sample image in each training set.

10. The method for training a classification model according to claim 9, wherein the first predetermined number of training sets further share at least one layer of the feature extraction layers set with respect to at least one of the predetermined local areas of the sample image in each training set.

11. The method for training a classification model according to claim 9, wherein in obtaining the extracted features of the sample image, the global area and the second predetermined number of predetermined local areas share at least one layer of the feature extraction layers set for the global area and each predetermined local area, and the global feature and each local feature are combined in the shared at least one layer, to obtain combined features of each sample image.

12. The method for training a classification model according to claim 11, wherein in calculating the lost function of the sample image and training the classification model, with respect to each sample image, the loss function of the sample image is calculated based on the combined features of the sample image by using the loss determination layer set with respect to a training set to which the sample image belongs, and the classification model is trained based on the loss function.

13. The method for training a classification model according to claim 9, wherein the second predetermined number of local areas have complementary information about the global area.

14. The method for training a classification model according to claim 8, wherein the feature extraction layers are convolutional layers of a convolutional neural network.

15. An apparatus for performing classification by using a classification model, comprising:
a memory; and
a processor coupled to the memory, the processor being configured to:
extract, with a corresponding number of feature extraction layers in the classification model which are set with respect to each training set of a first predetermined number of training sets respectively, features of an image to be classified respectively, to obtain extracted features of the image to be classified, wherein indexes of feature extraction layers set respectively for each training set are different;

perform, by using a corresponding number of initial fully connected layers and a final fully connected layer in the classification model which are set with respect to each training set of the first predetermined number of training sets respectively, a fusion on the extracted features of the image to be classified, to obtain fused features of the image to be classified, wherein the initial fully connected layers set for each training set are connected between the feature extraction layers and the final fully connected layer set for the training set, and the indexes of initial fully connected layers set for each training set respectively are different; and calculate, with loss determination layers in the classification model which are set with respect to the first predetermined number of training sets respectively, a loss function of the image to be classified based on the fused features of the image to be classified, and to classify the image to be classified based on the loss function, wherein the loss determination layers set for each training set are connected to the final fully connected layer set for the training set, and the loss determination layer set respectively for each training set is different, wherein in the classification model, the first predetermined number of training sets share at least one layer of the initial fully connected layers and the feature extraction layers which are set with respect to each training set respectively.

16. The apparatus for performing classification by using a classification model according to claim 15, wherein the processor is further configured to obtain a second predetermined number of local areas of the image to be classified, wherein each local area is a part of a global area of the image to be classified, wherein the processor is further configured to extract a global feature of the global area and a local feature of each predetermined local area by using the feature extraction layers set with respect to the global area and each local area in the classification model, and in the classification model, the global area and the second predetermined number of predetermined local area share at least one layer of the feature extraction layers set with respect to the global area and each predetermined local area respectively, so that the global feature and each local feature are combined in the at least one layer that is shared, to obtain combined features of the image to be classified, and the processor is further configured to calculate a loss function of the image to be classified based on the combined features of the image to be classified by using the loss determination layers set with respect to the first predetermined number of training sets in the classification model, and classify the image to be classified based on the loss function.

* * * * *